(12) United States Patent
Ford et al.

(10) Patent No.: US 6,515,857 B2
(45) Date of Patent: Feb. 4, 2003

(54) VISUAL HEAT SINK FOR COMPUTERS AND METHOD OF USE

(75) Inventors: Daniel A. Ford, Los Gatos, CA (US); James H. Kaufman, San Jose, CA (US); Owen R. Melroy, Morgan Hill, CA (US); Cameron S. Miner, San Jose, CA (US); Kevin P. Roche, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/858,751

(22) Filed: May 15, 2001

(65) Prior Publication Data

US 2002/0172005 A1 Nov. 21, 2002

(51) Int. Cl.[7] .................................................. G06F 1/20
(52) U.S. Cl. ........................ 361/687; 361/709; 343/702; 313/113
(58) Field of Search ................................. 361/687, 683, 361/708–709; 364/708; 343/702; 427/58; 313/113

(56) References Cited

U.S. PATENT DOCUMENTS

| | | | |
|---|---|---|---|
| 4,980,848 A | 12/1990 | Griffin et al. ............... 364/708 |
| 5,146,354 A | 9/1992 | Plesinger ..................... 359/49 |
| 5,313,362 A | 5/1994 | Hatada et al. ............... 361/709 |
| 5,796,581 A | 8/1998 | Mok ........................... 361/687 |
| 5,910,883 A | 6/1999 | Cipolla et al. .............. 361/687 |
| 5,946,187 A | 8/1999 | Cipolla ...................... 361/687 |
| 6,031,716 A | 2/2000 | Cipolla et al. .............. 361/687 |
| 6,052,280 A | 4/2000 | Dilley et al. ................ 361/687 |
| 6,128,186 A | 10/2000 | Feierbach ................... 361/683 |
| 6,141,216 A | 10/2000 | Holung et al. .............. 361/687 |
| 6,172,871 B1 | 1/2001 | Holung et al. .............. 361/687 |
| 6,181,284 B1 * | 1/2001 | Madsen et al. ............. 343/702 |
| 6,337,101 B1 * | 1/2002 | Gozdz ......................... 427/58 |
| 6,351,058 B1 * | 2/2002 | Roberts ....................... 313/113 |

* cited by examiner

*Primary Examiner*—Darren Schuberg
*Assistant Examiner*—Hung Van Duong
(74) *Attorney, Agent, or Firm*—Daniel E. Johnson

(57) ABSTRACT

Attractive heat sinks are used to cool the central processing unit and other solid state electronic components in electronic devices such as computers. In preferred embodiments, heat sinks snap onto one or both sides of a laptop computer to provide cooling. The heat sinks may consist of one or more sealed tubes of various cross sections containing a fluid mixture or solution. Preferred embodiments of the heat sinks rely on the principle of Rayleigh-Benard convection to provide a visually attractive "bubble lamp" display, "glitter lamp" display, or other convective fluid lamp display.

63 Claims, 7 Drawing Sheets

VISUAL HEAT SINK FOR COMPUTERS AND METHOD OF USE

TECHNICAL FIELD

The invention relates to solid state electronics devices and the thermal management of such devices. More particularly, the invention relates to a method and system of cooling computers, especially laptop computers.

BACKGROUND

Personal computers have become commonplace, offering computing power to the user and the attendant ability to perform a variety of tasks. Over time, the capability of computers has been enhanced, as the performance of the central processing unit (CPU) has increased and additional functions have been added, such as compact disk drives, modems, and speakers. This added capability has led to increased power requirements, which in turn has generated the need for efficiently dissipating the heat generated by various components in the computer, especially the heat produced by the CPU. The problem of waste heat management is especially acute in the case of portable computer systems, such as laptop computers. These computers are by their nature compact, which complicates the problem of thermal management.

Active cooling elements, such as a fan, can be added to a personal computer. Using a fan, however, is generally not desirable since a fan takes up space, generates noise, and consumes power. In the case of a laptop computer, power is typically generated by a battery pack, and to extend battery life, power should be conserved. Consequently, devices that actively cool are normally employed only as a last resort. In contrast to active cooling devices, passive cooling devices and methods are considered to be more desirable since they do not consume power. Passive cooling devices may include heat pipes or other components designed to transfer heat from the computer to its surroundings. In view of the expected increase in the power required to run portable computers as their capabilities continue to be upgraded, there is a need for efficiently coupling the heat generated by a computer to its surroundings.

SUMMARY OF THE INVENTION

In preferred embodiments of the invention, attractive heat sinks are used to cool the central processing unit and other solid state electronic components in electronic devices such as computers. In a preferred embodiment, the heat sinks advantageously attach to (e.g., snap onto) one or both sides of a laptop computer to provide cooling. The heat sinks may consist of one or more sealed tubes of various cross sections containing a fluid mixture or solution. Preferred embodiments of the heat sinks rely on the principle of Rayleigh-Benard convection to provide a visually attractive "bubble lamp" display, "glitter lamp" display, or other convective fluid lamp display.

In one aspect of the invention, there is provided a method of dissipating heat from a device. The method includes providing a conductive material in proximity with a heat-generating solid state electronic component, and providing a heat exchange material in proximity with the conductive material, in which the heat exchange material has an appearance that changes upon heating. The method further includes transferring heat to the conductive material, and transferring heat from the conductive material to the heat exchange material, thereby changing the appearance of the heat exchange material during operation of the device. The method also includes allowing heat to dissipate from the heat exchange material and away from the device. In one preferred method, the liquid crystal material is a patterned thermochromic material. In another preferred method, the changing of the appearance of the heat exchange material includes allowing patterns of colored fluid to continually change in appearance.

In another aspect of the invention, there is provided a method of dissipating heat. The method includes providing a conductive material in proximity with a heat-generating solid state electronic component in a device, and providing a container in proximity with the conductive material, in which the container has liquid therein. The method further includes transferring heat to the conductive material, transferring heat from the conductive material to the liquid, and using convection or conduction within the liquid to dissipate heat away from the device. In preferred implementations of the method, the container is a convective fluid lamp displaying continually changing fluid patterns, a glitter lamp, or a bubble lamp. In one preferred method, audio waves are directed into the liquid to vibrate the liquid.

In yet another aspect of the invention, there is provided a method of dissipating heat from a solid state electronic device. The method includes turning on the device, thereby generating heat from a solid state electronic component within the device, and directing excess heat away from the component. The method further includes using the excess heat during operation of the device to create an effect designed to be visually pleasing to a user of the device, while dissipating the excess heat away from the device.

In one embodiment of the invention, a device includes at least one solid state electronic element that generates heat, a conductor in thermal communication with said at least one element, and a heat exchange material in thermal communication with the conductor. The heat exchange material has an appearance that changes upon heating during operation of the device, with the heat exchange material receiving heat from the conductor and transferring heat away from the device.

In another embodiment of the invention, a device includes at least one solid state electronic element that generates heat, a conductor in thermal communication with said at least one element, and a vessel for containing liquid. The vessel is in thermal communication with the conductor, such that when the vessel contains liquid, heat is transferred from said at least one element to the liquid and from the liquid to away from the device. In preferred embodiments, the vessel includes a bubble lamp, a glitter lamp, or a convective fluid lamp displaying continually changing fluid patterns.

In yet another embodiment of the invention, a computer includes a base portion and a cover pivotally mounted to the base portion, in which at least one of the base portion and the cover includes at least one component that generates heat. The computer further includes at least one heat cell configured to receive liquid, in which said at least one cell is in thermal communication with said at least one component, such that when said at least one cell contains liquid, heat is transferred from said at least one component, to the liquid, and away from the computer, thereby maintaining the temperature of the computer within a working range.

In another embodiment of the invention, a computer includes a base portion and a cover pivotally mounted to the base portion, in which at least one of the base portion and the cover includes at least one component that generates heat.

The computer further includes at least one liquid-containing cell, in which the liquid is in thermal communication with said at least one component, such that heat is transferred from said at least one component to the liquid and then from the liquid to away from the computer, thereby maintaining the temperature of the computer within a working range. In a preferred embodiment, the computer includes a central processing unit (CPU), the base portion of the computer includes an input/output device, and the cover of the computer includes a display. In one preferred embodiment, the computer includes a disk drive. In a preferred embodiment, said at least one cell is attached to the cover and may include fasteners that mate with the cover. In preferred implementations, said at least one cell includes a bubble lamp, a glitter lamp, or a convective fluid lamp that displays continually changing fluid patterns.

In a preferred embodiment of the invention, a computer includes at least one component that generates heat and a heat exchange material in thermal communication with said at least one component. The heat exchange material has an appearance that changes upon heating during operation of the computer, in which heat is transferred from said at least one component to the heat exchange material and then from the heat exchange material to away from the computer to maintain the temperature of the computer within a working range.

DETAILED DESCRIPTION OF THE INVENTION

Passive cooling devices and methods are described herein, in which waste heat generated by solid state electronic components in a computer or another solid state electronic device is effectively coupled away from the device to its surroundings. The temperature of the device is thereby maintained within a safe operating temperature range, so that the device is not damaged from overheating. In preferred embodiments, visually attractive heat sinks are used to cool the central processing unit (CPU) and heat-generating components within a computer. These heat sinks may be containers of liquid, in which heat is coupled to the liquid and then away from the computer. The liquid-containing heat sinks may be advantageously designed so that the user experiences a visually pleasing effect as he or she works. Alternatively, the heat sinks may include metallic structures (e.g., aluminum) that are coated with a liquid crystal material or film that changes its appearance as heat passes through the heat sink.

Figure 1:
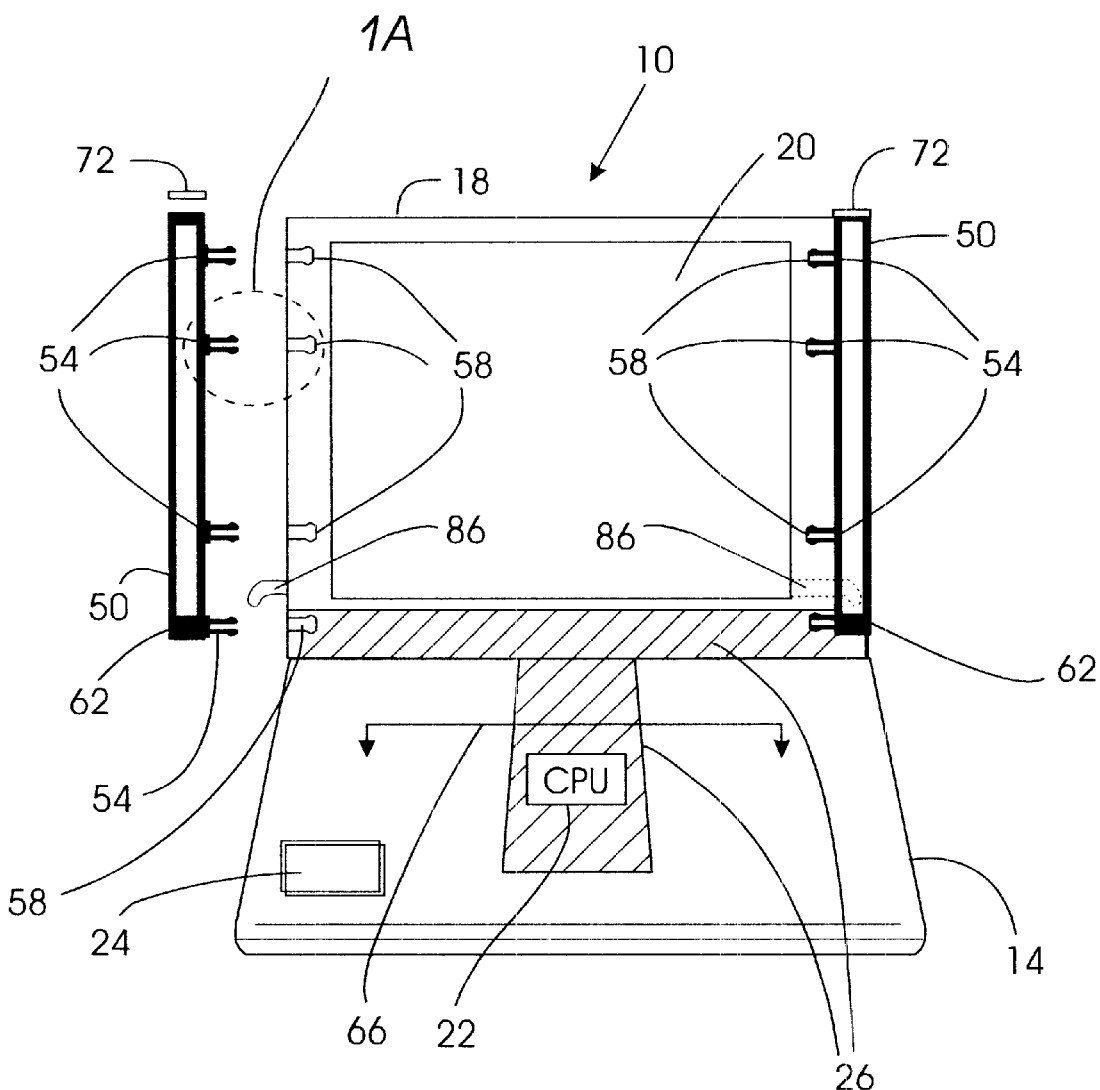
FIGS. 1 and 2 show views of a laptop computer integrated with heat sink members for cooling components within the computer, in which the heat sink members are disposed on either side of the computer's cover.
Figure 2:
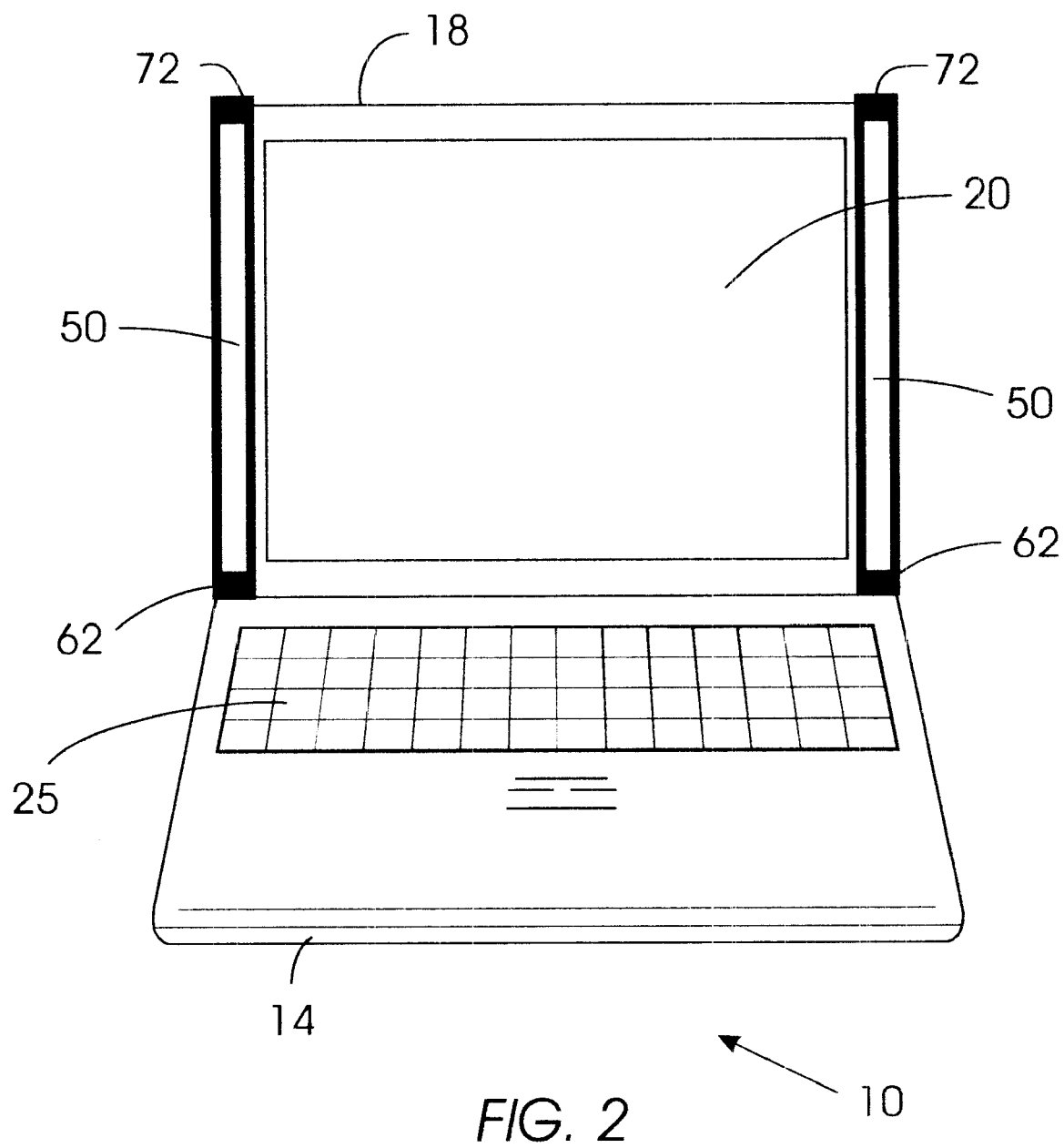

A preferred embodiment is described with respect to FIGS. 1 and 2, in which a computer, such as a laptop computer, is shown. Other embodiments (not shown) are directed to other kinds of solid state electronic devices, such as televisions, stereos, and amplifiers, in which waste heat from the device is coupled to its surroundings. FIG. 1 shows a cutaway of a laptop computer 10 that includes a base portion 14 and a cover 18. The base portion 14 includes solid state electronic component(s), such as a CPU 22 as well as other solid state electronic components (not shown) that generate heat during operation. A disk drive 24 is indicated in the base portion 14 as well. (Alternatively, some or all of the electronic components may be located in the cover 18, which preferably includes a display 20 like a monitor screen.) FIG. 2 illustrates how the embodiment shown in FIG. 1 appears to the user. In particular, an input/output device such as a keyboard 25 forms part of the base portion 14 and is suitably integrated with the CPU 22, so that the user can input commands or data into the computer 10.

The CPU 22 is advantageously in thermal communication with a conductor 26 that is preferably in close proximity with (e.g., in contact with) the CPU, so that the heat generated by the CPU is carried away, thereby maintaining the temperature of the CPU within a safe operating range. (Additionally, any other heat-generating solid state electronic components are also advantageously in thermal communication with the conductor 26.) The conductor 26 may be any suitable thermally conducting material, such as an alloy of copper. The conductor 26 is shown in FIG. 1 as extending from the base portion 14 into the cover 18 and may include a plurality of pieces. In the embodiment shown in FIG. 1, for example, one portion of the conductor 26 is located in the base portion 14, and another portion of the conductor 26 is located in the cover 18. These portions of the conductor 26 may be hinged together to form interlocking sleeves (much like a door hinge) through which a pin (not shown) passes. The pin may advantageously act as a heat pipe in its own right to facilitate cooling of the CPU 22. The use of hinges, heat pipes, and sleeves in dissipating heat, as well as various arrangements for using them, are discussed in U.S. Pat. No. 6,031,716 to Cipolla et al. entitled "Computer incorporating heat dissipator with hinged heat pipe arrangement for enhanced cooling capacity" and U.S. Pat. No. 6,172,871 to Holung et al. entitled "Method and system in a data processing system for efficiently cooling a portable computer system", both of which are hereby incorporated by reference.

Figure 1A:
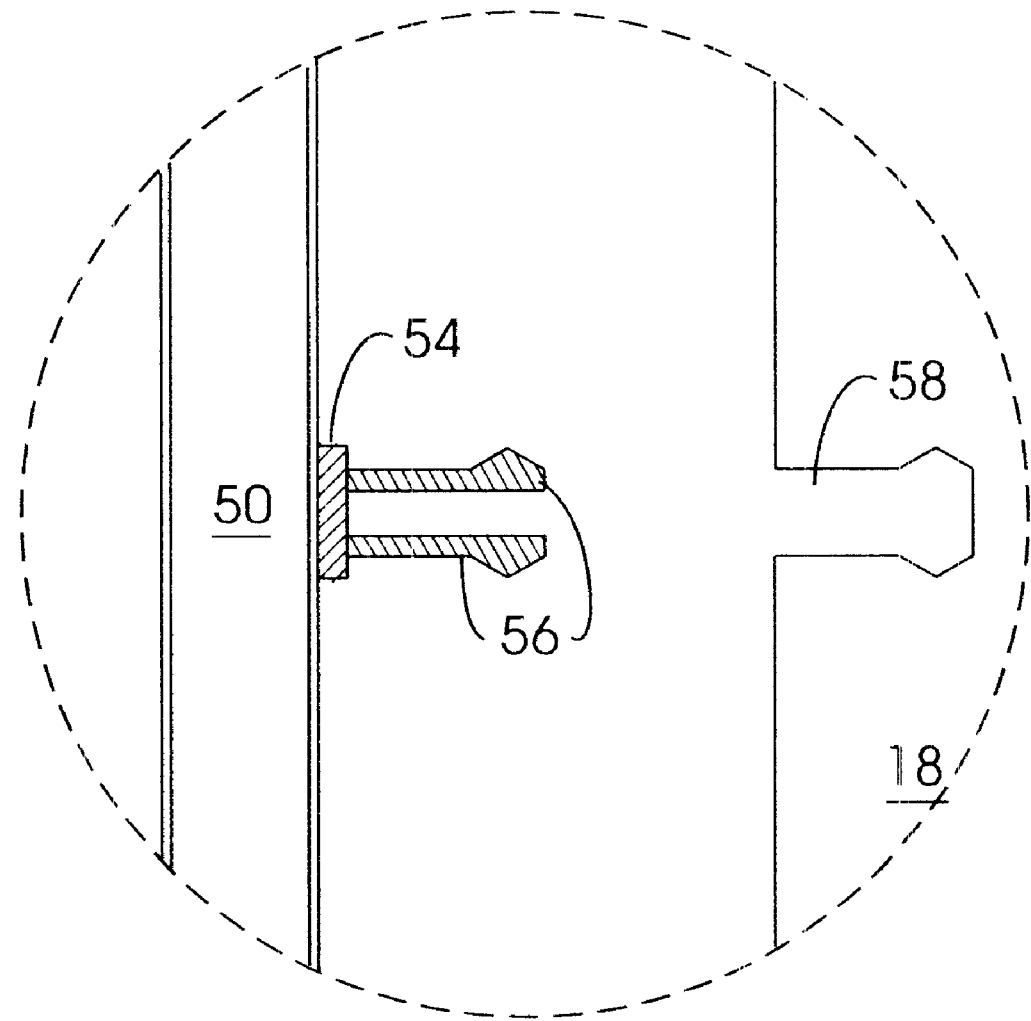
FIG. 1A shows an expanded view of how the heat sink members may be mated with the cover of the computer.

The conductor 26 is shown in FIG. 1 as extending to both the left hand and right hand sides of the cover 18. On each side of the cover 18 is a heat sink member 50 or cell (although in some embodiments the computer may use only one heat sink member 50) that preferably includes a plurality of snap-in fasteners 54 that mate with receptacles or holes 58 in the cover 18. The heat sink member 50 on the right hand side of the cover 18 is shown installed, whereas the heat sink member on the left hand side is shown in an exploded, uninstalled view. A preferred snap-in fastener 54 is shown in greater detail in FIG. 1A. The snap-in fastener 54 is secured to the heat sink member 50 (e.g., through the use of epoxy) and includes two prongs 56 that permit the fastener to be inserted into and removed from one of the holes 58 in the cover 18.

At the base of each heat sink member 50 is a heat-conducting element 62 that may be advantageously epoxied to the bottom of the heat sink member (and that may also include a snap-in fastener 54). The heat-conducting elements 62 are in thermal communication with (e.g., contact) the conductor 26, and in particular, with the far right hand and far left hand portions of the conductor, so that heat is effectively transferred from the CPU 22 (and other heat-generating solid state electronic components) to the heat sink members 50, via the conductor 26 and the heat-conducting elements 62. Heat then dissipates away from the heat sink members 50 and away from the computer 10. To promote good heat transport from the heat-generating solid state components (such as the CPU 22) to the heat sink members 50, the total contact area between the conductor 26 and the heat sink members 50 is preferably equal to or greater than that of the cross sectional area of the conductor along a plane perpendicular to the base portion 14, e.g., the plane defined by the line segment 66. In a preferred example, the contact area between each of two heat sink members 50 and the conductor 26 is 0.5 cm×2–3 cm.

As an alternative to using the heat-conducting elements 62, a portion of the heat sink member 50 itself may be used for this purpose by butting the conductor 26 against the heat sink member(s) 50. This approach may be satisfactory if the heat sink members 50 themselves are sufficiently good thermal conductors, but otherwise the thermal communication between the conductor 26 and the heat sink member(s) 50 may be inadequate.

The heat sink members 50 include heat exchange material so that heat originating in the CPU 22 and other solid state electronic components within the computer 10 can be dissipated away from the computer. The heat sink members 50 advantageously include a heat exchange material that changes its appearance during operation as temperature varies, so that a visually pleasing effect is created as heat is dissipated away from the device. In one embodiment, the heat sink members 50 include thermally conductive material that includes or is coated with a liquid crystal material 80, as shown by the heat sink member 50a in FIG. 3. Alternatively, the heat sink members 50 may be containers 50b for holding liquid 84, like that shown in FIG. 4. In either case, a temperature sensor within the computer 10 having output on the display 20 may be used to warn the user if the computer is overheating, e.g., as a result of the heat sink members 50 not functioning properly.

Figure 3:
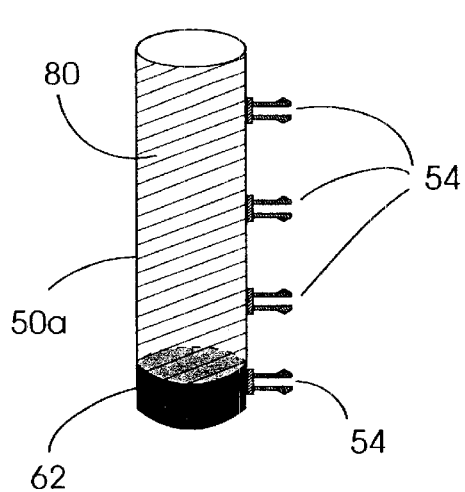
FIG. 3 shows a heat sink member that can be used in the embodiment of FIGS. 1 and 2, in which the heat sink member employs liquid crystal material.

In FIG. 3, the liquid crystal material 80 may advantageously include one or more thermochromic liquid crystals (TLCs) secured to the heat sink member 50a. The TLCs may be painted onto the heat sink member 50a or bonded thereto in the form of a liquid crystal loaded polymer host. Since many TLCs are two color designators, several TLCs may be combined to give a multicolored display or patterned to form a TLC thermometer, logo, or temperature sensitive design. Common TLCs include organic cholesteric liquid crystal of phenylbenzoate esters and/or mixtures thereof.

Figure 4:
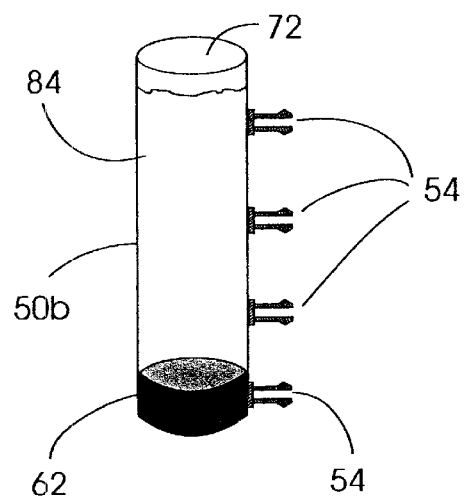
FIG. 4 shows a heat sink member that can be used in the embodiment of FIGS. 1 and 2, in which the heat sink member includes liquid.
Figures 5A, 5B, 5C, 5D, 5E, 5F:
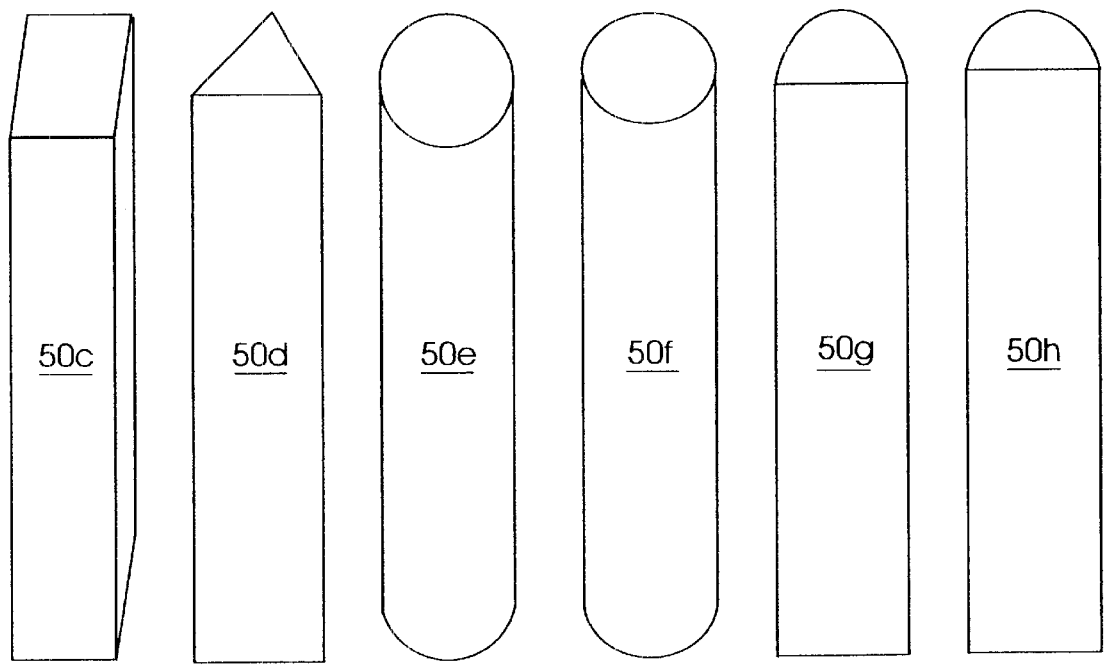
FIGS. 5A–5F show perspective views of heat sink members having various cross sections.

The heat sink members of FIG. 4 are sealed containers 50b for holding the liquid 84, in which the liquid functions as a heat exchange material, e.g., through convection, as discussed below. The containers 50b are advantageously closed tubes extending along part or the entire length of (or even above and beyond) the sides of the cover 18. The containers 50b may be a rugged material, e.g., a strong, transparent plastic, and may be either of unitary construction or include caps 72 (of similar material), as shown in FIGS. 1 and 2. If the liquid containers 50b extend along the entire length of the cover 18, they may be about 9 inches in length, depending upon the size of the computer. The liquid containers 50b themselves (and the heat sink members 50a) may have a cross section of about 1 in$^2$ in the form of a square or rectangle (50c), triangle (50d), circle (50e), ellipse (50f), semicircle (50g), or semiellipse (50h), as illustrated by the containers shown in FIGS. 5A–F, respectively. The embodiments employing the liquid containers 50b are designed to function best when the cover 18 is open and upright. Although the cover 18 does not need to be perfectly vertical during operation, the convection and conduction embodiments herein depend on establishing a net downward gravitational force on fluid within the liquid containers 50b.

The containers 50b may be configured in various ways so that they act as, for example, a bubble lamp, a glitter lamp, or a convective fluid lamp displaying continually changing fluid patterns (preferably involving color), like a LAVA lamp. In each case, the containers 50b are preferably illuminated for visual effect using light generated by the display 20, such as a thin film transistor liquid crystal display (TFT LCD), or another backlight source. In the embodiment of FIG. 1, this is accomplished by opening a slot in the cover 18 and guiding light from the back of the display 20 up against (e.g., butting up behind) the heat sink member 50 (in this embodiment, the liquid container 50b) using a waveguide 86 such as an optical fiber. Alternatively, a lightpipe plastic film or sheet may be used to guide the light.

Figure 6:
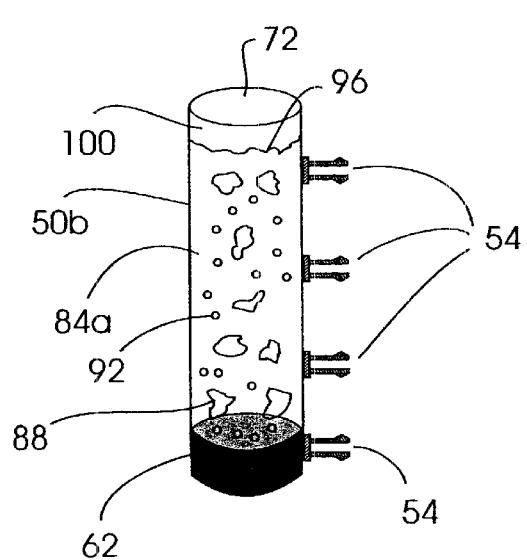
FIG. 6 shows a heat sink member that can be used in the embodiment of FIGS. 1 and 2, in which the heat sink member acts as a bubble lamp.

A preferred bubble lamp embodiment is now described. If the containers 50b are configured as bubble lamps, then the container 50b holds a liquid 84a (FIG. 6) that has a boiling point preferably slightly above room temperature, say, at 82° F. The liquid 84a may be mixed with a colored compound or dye 88 such as a soluble dye for visual effect. The liquid 84a is heated from below as a result of the heat transferred to the heat-conducting element 62 that originates from the CPU 22 and heat-generating solid-state electronic components in the computer 10. As the liquid 84a begins to boil, bubbles 92 rise from the bottom of the container 50b up to the surface 96 of the liquid 84a. As the bubbles 92 rise to the top, vapor within the bubbles cools by conduction, thereby liquefying the vapor. As a result, heat is transferred from the liquid 84a to the surrounding environment. To work efficiently as a bubble lamp, the volume 100 within the container 50b (which is above the surface 96 of the liquid 84a) preferably constitutes 2.5–30% of the total volume within the container 50b, thereby providing surface area for cooling the vapor and allowing for expansion of the liquid 84a. Additionally, the volume 100 may be under partial vacuum to lower the boiling point of the liquid 84a.

Fluids that can be used as the liquid 84a in a bubble lamp embodiment include methanol (b.p. 65° C. at 1 atmosphere), acetone (b.p. 56.2° C. at 1 atmosphere), and water (b.p. 100° C. at 1 atmosphere). For safety reasons, a preferred fluid to be used as the liquid 84a in the bubble lamp embodiment is water. At 25° C. (room temperature) the vapor pressure of water is 23.8 torr, so that evacuating the container 50b to below 23.8 torr would cause the water to boil at this temperature. The air in the container 50*b* may accordingly be initially evacuated, e.g., to 10 torr or less. At this pressure, when the computer 10 is off and no heat is being generated, the water in the container 50*b* will reach equilibrium and the partial pressure of water will fall below approximately 23.8 torr, causing the boiling to stop. When the computer 10 is turned on and heat is coupled into the container 50*b* and the liquid 84*a* therein, a temperature gradient across the container 50*b* is set up causing the liquid 84*a* to boil (bubble) at the bottom of the container, with the liquid then cooling (condensing) at the top of the container near the surface 96. By operating below atmospheric pressure, the problem of high pressure is avoided, so that the container 50*b* will not explode when the computer 10 is on (or exposed to sunlight). The water may be advantageously colored with a water soluble dye, so that when the computer 10 is on and heat is being generated, the bubbling action within the liquid 84*a* is visually pleasing to the user.

Other embodiments of the container 50*b* operate predominately on a different physical principle, namely, convection. Convection is an efficient way to transport and dissipate heat through a fluid. In order for convection to begin, it is necessary that the net buoyancy force caused by the temperature gradient within the container 50*b* exceed the dissipative forces of viscous drag. It is convenient to work with the Rayleigh number Ra, which is simply the buoyancy force divided by the product of the viscous drag and the rate of heat diffusion:

$$Ra = g\beta \Delta T L3/\alpha v$$

Here β is the liquid's coefficient of thermal expansion, ΔT is the temperature difference in the liquid between the hot and cold ends of the container 50*b*, L is the height of the liquid column in the container 50*b*, α is the thermal diffusivity of the liquid, v is the kinematic viscosity of the liquid, and g is the acceleration of gravity (9.8 m/s$^2$). Convection begins when the Rayleigh number exceeds a critical value of approximately 1700 for liquid in a closed surface container, and above approximately 1100 for liquid in a container having a free surface. Note that in a narrow container, the walls will increase the "effective" kinematic viscosity of the liquid, thereby requiring a somewhat higher temperature gradient to induce convection.

Viscosity is a measure of the resistance of a fluid to a change in momentum and is given by:

$$\sigma = \mu dv/dz$$

Here σ=the shear stress applied to the fluid, μ=the dynamic viscosity of the fluid, and dv/dz =the change in the fluid's velocity component in the vertical direction. Thus, viscosity is like a frictional force that opposes the direction of fluid motion. On heating the bottom of the container 50*b*, the density of the fluid at the bottom of the container decreases, making it more buoyant than the fluid at the top of the container. This buoyancy force (which arises from gravity) may be regarded as an upward force on fluid near the bottom of the container 50*b*, or as a net downward force on the cooler, less dense fluid at the top of the container 50*b*. Viscosity acts against this buoyancy force and impedes the fluid's motion. Although convection is not the only mode of heat transfer that may occur in a convective fluid lamp (e.g., a LAVA or a glitter lamp) embodiment such as those described herein, it is the dominant mode for sufficiently large temperature gradients. Conduction, however, plays a role as warmer fluid is displaced into cooler fluid and heat diffuses out to the surrounding fluid; as temperature differences within the liquid are reduced by heat diffusion, the buoyancy force decreases.

The fluid flow pattern within the container 50*b* depends on the ratio of the momentum diffusivity to the thermal diffusivity, which is defined as the Prandtl number Pr:

$$Pr = Cp \, v/k$$

Figure 7A:
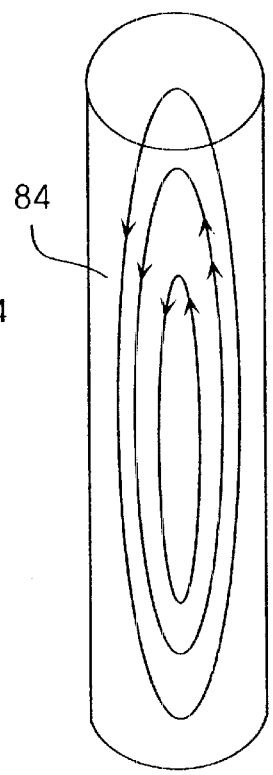
FIGS. 7A and 7B show how the convective flow pattern within a heat sink member can change depending upon the fluid's properties and temperature.
Figure 7B:
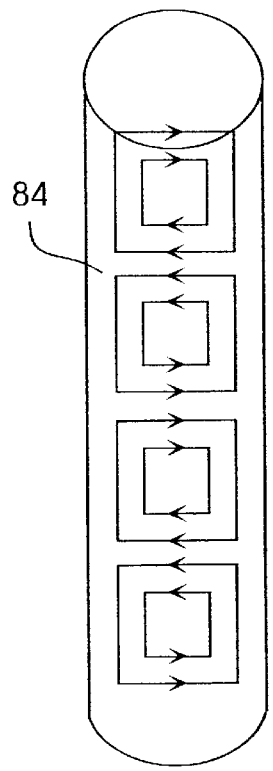

Here Cp is the heat capacity and k is the thermal conductivity. As the Prandtl number changes, so too does the convection pattern within the container 50*b*. As the Prandtl number increases (i.e., as the temperature gradient increases), the convection pattern changes from (i) simple rolls (such as those shown in FIG. 7A) to (ii) a more complex 3-dimensional steady state flow pattern that can be visualized as interlocking hexagons, squares, or other polygons (such as those shown in FIG. 7B). The shape of the polygons depends not only on the Prandtl number but also on the shape of the container 50*b*, since boundary conditions play a crucial role in the development of fluid flow. As the Prandtl number increases further, the fluid flow will evolve from (iii) irregularly shaped patterns, to (iv) narrow rising regions of nearly isothermal circulation, and finally to (v) turbulent convection displaying no persistent spatial pattern.

Figure 8:
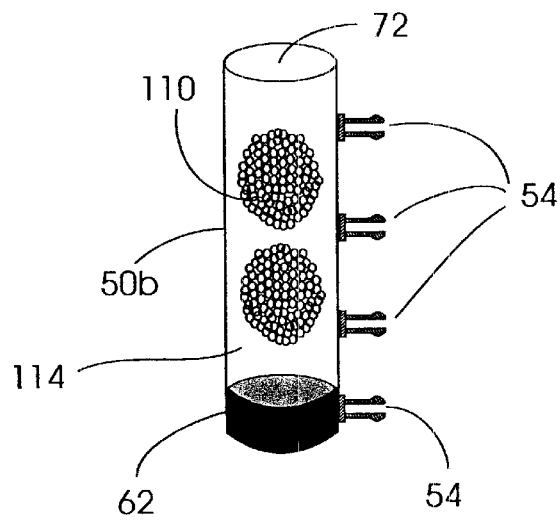
FIG. 8 shows a heat sink member that can be used in the embodiment of FIGS. 1 and 2, in which the heat sink member acts as a convective lamp, similar to a LAVA lamp.

In one such convection-based embodiment, the container 50*b* functions like a LAVA lamp, in which a colored fluid 110 moves within a transparent or nearly transparent fluid 114, as shown in FIG. 8. (Details regarding LAVA lamps may be found in the 1992 Edition of Popular Electronics Hobbyists handbook, published by Gernsback Publications Inc., USA). For greatest visual effect, the two fluids 110 and 114 should be immiscible. The colored fluid 110 preferably is insoluble in the fluid 114, denser than the fluid 114, non-reactive with the fluid 114, and more viscous than the fluid 114. In addition, the fluid 110 is preferably nonpoisonous, nontoxic, non-pyrophoric, chlorinated, and emulsifiable in the fluid 114 (i.e., it should separate rapidly from it). Additionally, the fluid 110 preferably has a coefficient of expansion that is greater than that of the fluid 114, so that the fluid 110 becomes buoyant when heated. A preferred fluid 110 is benzyl alcohol (specific gravity 1.043, boiling point 204.7° C., slightly soluble in water) to which a dye such as an oil soluble dye has been added for color effect. However, cinnamyl alcohol (sp. g. 1.04, b.p. 257.5° C., sl. soluble in water), diethyl phthalate (sp. g. 1.121, b.p. 298° C., insoluble in water), and ethyl salicylate (sp. g. 113, b.p. 233° C., insoluble in water) may be used in place of benzyl alcohol. The dyes used in permanent felt-tip pens may be included in the fluid 110. Common oil soluble dyes soluble in benzyl alcohol include martius yellow, p-dimethylaminoazobenzene (yellow), crystal violet, methylene blue, indigo, and 2-dihydroxyanthraquinone (red).

The fluid 114 may be water, salt water, a water-isopropanol solution, or any of these to which a preservative to prevent the growth of algae has been added. In addition, a trace of an antioxidant such as BHA or BHT can be added to the fluid 114 to add color and contrast. The fluid 114 is preferably inexpensive, nonflammable, and non-reactive with air and the container's walls (which may be a rugged plastic).

Depending on the temperature gradient across the fluids in the container 50*b* (which depends on the amount of heat generated by the electronic components in the computer 10 and the efficiency of the thermal communication between the conductor 26 and the fluids in the container 50*b*), the specific gravity and other properties (such as density, viscosity thermal conductivity) of the fluids can be varied to tune the Prandtl number and the critical Rayleigh number. In this way, the flow pattern generated in the container 50b during convection can be tailored to a user's liking.

If saltwater is used as the fluid 114, varying the amount of salt in the fluid 114 can be used to match (or nearly match) the relative specific gravities of the fluids 110 and 114. The higher the specific gravity of the fluid 110, the greater the salt concentration required in the fluid 114. The salt concentration needed may be determined empirically by combining the fluid 110 and the fluid 114 in a beaker, warming the resulting solution to speed up the dissolution of salt, and slowly adding salt until the fluid 114 sinks to the bottom and the fluid 110 just floats on top of the fluid 114. In one preferred embodiment, the fluid 114 includes water, a preservative, and less than 150 g/l of NaCl (i.e., less than a 15% salt concentration). Likewise, the specific gravity of a water-isopropanol solution may be adjusted by varying the isopropanol concentration. (Salt acts to raise the specific gravity of the solution, whereas isopropanol lowers it.) In preferred embodiments, the volume of the fluid 110 should be less than 75% of the container's volume, and in more preferred embodiments less than 50% of the container's volume, with a small air gap constituting 10% of the container's volume at the top of the container 50b to accommodate fluid expansion. The remaining volume fraction of the container may be dedicated to the fluid 114.

Figure 9:
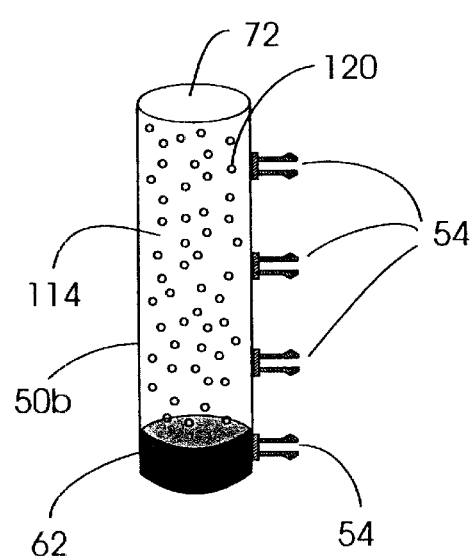
FIG. 9 shows a heat sink member that can be used in the embodiment of FIGS. 1 and 2, in which the heat sink member acts as a glitter lamp.

In another convection-based embodiment, the container 50b functions as a glitter lamp, as illustrated in FIG. 9. In a preferred glitter lamp embodiment, reflective particles 120 are used instead of the fluid 110 of the embodiment shown in FIG. 8, but is otherwise similar to it. The reflective particles 120 are preferably highly reflecting of visible light. Although the particles 120 are preferably denser than the fluid 114, they nevertheless circulate in the fluid 114 once convection begins in the container 50b. As the particles 120 circulate with the convective flow of the fluid 114, they advantageously create a visual pattern pleasing to the user.

Figure 10:
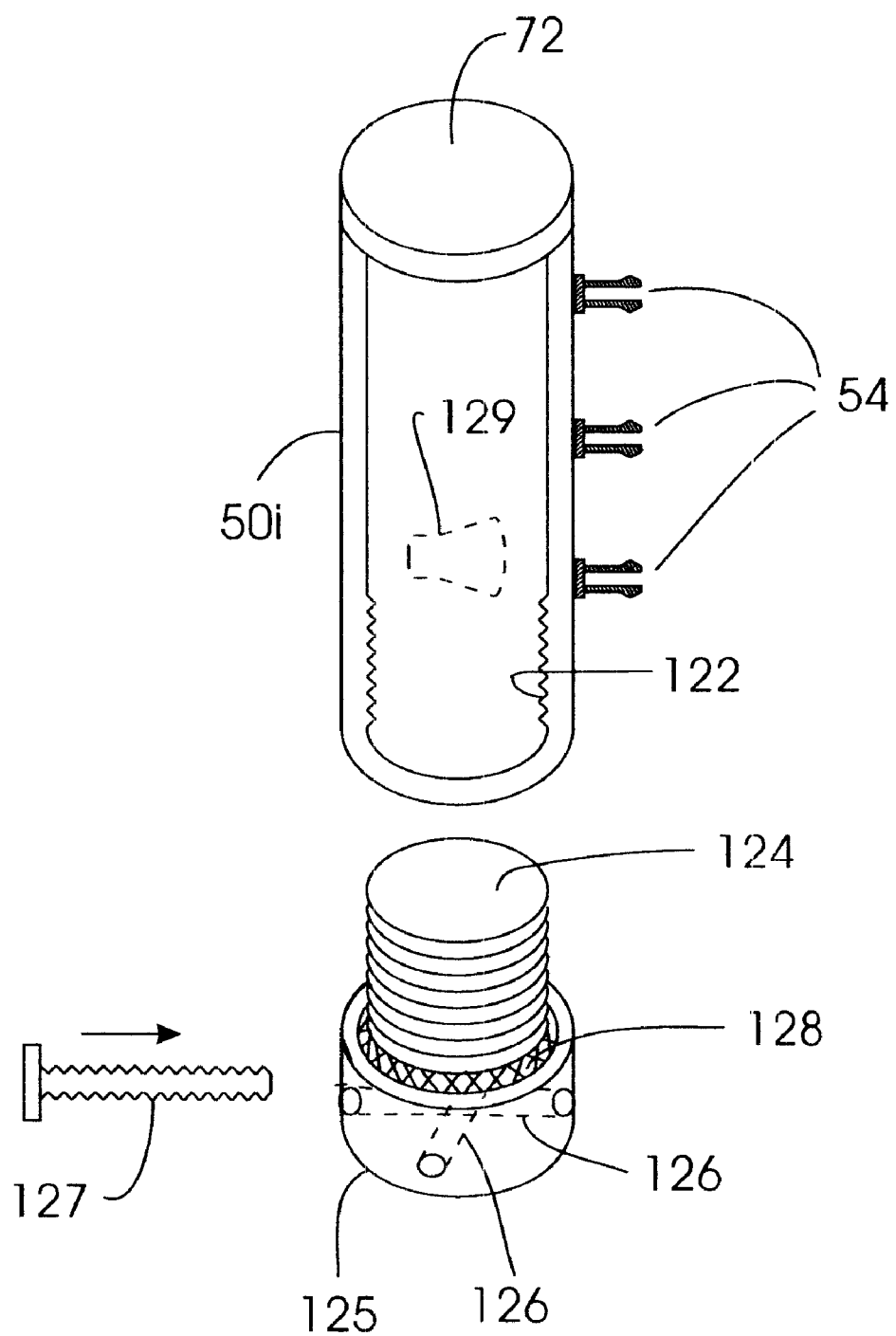
FIG. 10 shows an alternative heat sink member that can be used in the embodiment of FIGS. 1 and 2.

FIG. 10 shows an alternative to the container 50b that may be used in the embodiments herein in which liquid acts as the heat sink. A container 50i for holding liquid has a cap 72 and a threaded wall 122 that mates with a threaded plug 124. The threaded plug 124 is secured to a bottom cap 125 that functions as a heat-conducting element. The bottom cap 125 preferably includes a pair of crossed, threaded bore holes 126. A screw 127 may pass through one or the other of the bore holes 126 and into the cover 18 (not shown in FIG. 10) to make thermal contact with the conductor 26, so that heat is coupled from the heat-generating elements in the computer 10 to liquid within the container 50i. The bottom cap 125 and the screw 127 are preferably a high thermal conductivity, all-metal, corrosion-resistant alloy of aluminum, brass, or copper. An O-ring seal 128 ensures that the container 50i does not leak when it is assembled. Alternatively, a bottom cap may be used that is epoxied directly to a container for holding liquid.

In the bubble lamp and convective fluid lamp embodiments herein, the fluid pattern in a liquid container may be modulated by placing one or more speakers 129 near the container 50i (or 50b). Alternatively, a separate piezoelectric or electromechanical device (not shown) may be placed near or at the liquid container (e.g., at its base), causing it to vibrate. The speakers, piezoelectric, or electromechanical device may be coupled to the computer 10 and advantageously generate audio waves related to the user's experience, e.g., the audio waves may represent music or narration related to a particular application. The resulting vibrations alter the flow pattern within the container 50i (or 50b), so that the user's visual and audio experiences are linked.

Figure 11:
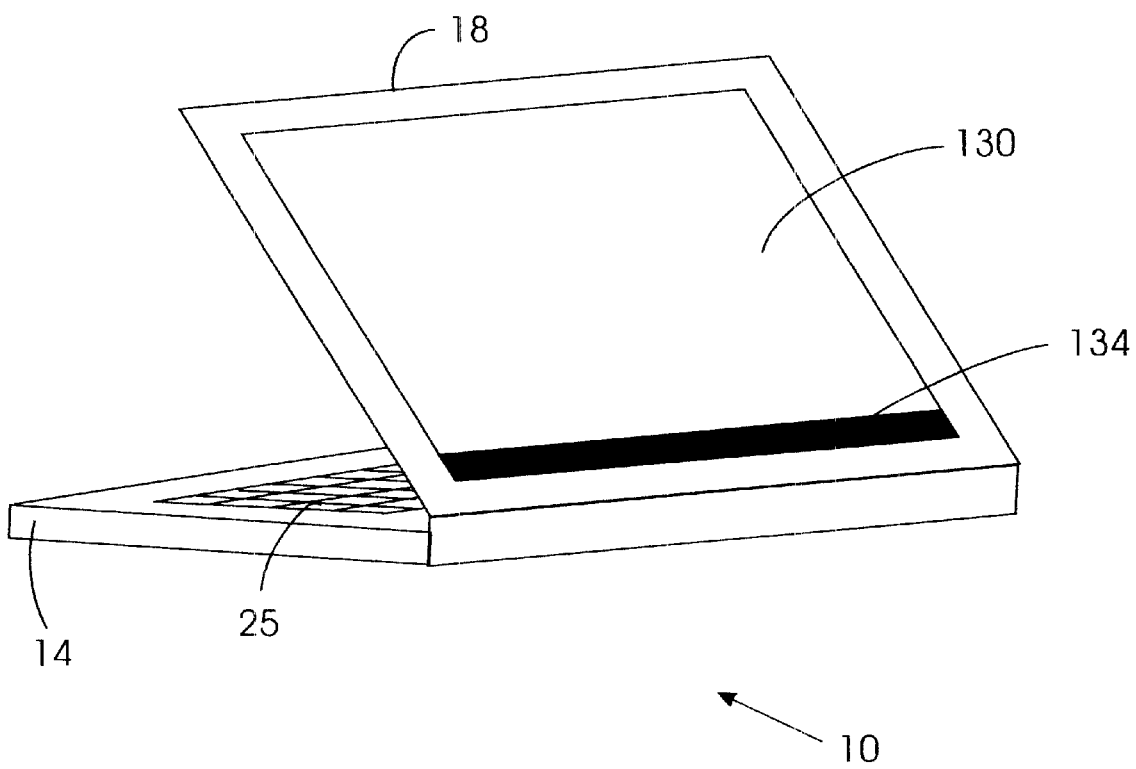
FIG. 11 shows a laptop computer integrated with a heat sink member for cooling components within the computer, in which the heat sink member is disposed on the top side of the computer's cover.

Although preferred embodiments above have been described with respect to heat sink members 50 (e.g., containers 50b) disposed on either side of the display 20, heat sink members may also be placed on top of the cover 18, so that visual effects like those described herein are evident to people other than the user. In one such embodiment, shown in FIG. 11, a heat sink member 130 extends across (or even beyond the periphery of) the cover 18, in which the heat sink member includes liquid and operates on the principle of convection or conduction as disclosed herein (e.g., the heat sink member acts as a convective fluid lamp or a bubble lamp). Alternatively, a heat sink member may be used that is metallic and has liquid crystal material (e.g., thermochromic material) thereon. In analogy with the other embodiments disclosed herein, the heat sink member 130 may include at its base a thermally conductive material 134 that is in contact with a conductor (not shown in FIG. 11) that runs along the entire length of the cover 18.

The invention may be embodied in other specific forms without departing from its spirit or essential characteristics. The described embodiments are to be considered in all respects only as illustrative and not restrictive. The scope of the invention is therefore indicated by the appended claims rather than the foregoing description. All changes within the meaning and range of equivalency of the claims are to be embraced within that scope.

What is claimed is:

1. A method of dissipating heat from a device, comprising:
   providing a conductive material in proximity with a heat-generating solid state electronic component;
   providing a heat exchange material in proximity with the conductive material, the heat exchange material having an appearance that changes upon heating;
   transferring heat to the conductive material;
   transferring heat from the conductive material to the heat exchange material, thereby changing the appearance of the heat exchange material during operation of the device, wherein said changing the appearance of the heat exchange material is designed to be visible to a user of the device; and
   allowing heat to dissipate from the heat exchange material and away from the device.

2. The method of claim 1, wherein the heat exchange material is a liquid.

3. The method of claim 1, wherein liquid crystal material is in proximity with the heat exchange material.

4. The method of claim 3, wherein the liquid crystal material is a patterned thermochromic material.

5. The method of claim 1, said changing the appearance including allowing patterns of colored fluid to continually change in appearance.

6. The method of claim 1, wherein the device includes a computer.

7. A method of dissipating heat, comprising:
   providing a conductive material in proximity with a heat-generating solid state electronic component in a device;
   providing a transparent container in proximity with the conductive material, the container having liquid therein;
   transferring heat to the conductive material;
   transferring heat from the conductive material to the liquid; and
   using convection or conduction within the liquid to dissipate heat away from the device, in order to maintain the temperature of the component in a safe operating range.

8. The method of claim 7, wherein the container is a convective fluid lamp displaying continually changing fluid patterns.

9. The method of claim 7, wherein the container is a glitter lamp.

10. The method of claim 7, wherein the container is a bubble lamp.

11. The method of claim 7, further comprising directing audio waves into the liquid to vibrate the liquid.

12. The method of claim 7, wherein the liquid includes a colored compound.

13. The method of claim 7, wherein the device includes a computer.

14. A method of dissipating heat from a solid state electronic device, the device including a solid state component that generates heat when the device is turned on, comprising:

directing excess heat away from the component after the device has been turned on; and using the excess heat during operation of the device to create an effect designed to be visually pleasing to a user of the device, while dissipating the excess heat away from the device, wherein the device is designed to have utility apart from said visually pleasing effect.

15. The method of claim 14, comprising:

providing a conductive material in proximity with the heat-generating solid state electronic component;

transferring heat to the conductive material;

providing a heat exchange material in proximity with the conductive material; and transferring heat from the conductive material to the heat exchange material to create the visually pleasing effect.

16. The method of claim 14, wherein the device includes a computer.

17. The method of claim 15, comprising allowing heat to dissipate from the heat exchange material and away from the device.

18. The method of claim 15, wherein the visually pleasing effect includes patterns of colored fluid.

19. A device, comprising:

at least one solid state electronic element that generates heat;

a conductor in thermal communication with said at least one element; and a heat exchange material in thermal communication with said conductor, said heat exchange material having an appearance that changes in a way that is noticeable to a user of the device upon heating during operation of said device, said heat exchange material receiving heat from said conductor and transferring heat away from said device to maintain the temperature of the element in a safe operating range.

20. The device of claim 19, wherein said heat exchange material includes metal in combination with liquid crystal material.

21. The device of claim 19, comprising at least one liquid-containing heat sink cell in thermal communication with said at least one element, such that heat is transferred from said at least one element to said liquid and then from said liquid to away from said device.

22. The device of claim 19, said device including a computer.

23. A device, comprising:

at least one solid state electronic element that generates heat;

a conductor in thermal communication with said element; and a vessel for containing liquid, the liquid being visible to a user of the device during operation of the device, said vessel being in thermal communication with said conductor, such that when said vessel contains liquid, heat is transferred from said at least one element to the liquid and from the liquid to away from said device.

24. The device of claim 23, said device including a computer.

25. The device of claim 23, said vessel comprising a bubble lamp.

26. The device of claim 23, said vessel comprising a glitter lamp.

27. The device of claim 23, said vessel comprising a convective fluid lamp displaying continually changing fluid patterns.

28. The device of claim 23, wherein said vessel includes a liquid selected from the group consisting of benzyl alcohol, cinnamyl alcohol, diethyl phthalate, and ethyl salicylate.

29. The device of claim 23, wherein said liquid includes a colored compound.

30. The device of claim 23, said vessel including liquid having a Rayleigh number of greater than about 1700.

31. The device of claim 23, wherein light is directed into said vessel to produce a visual effect.

32. The device of claim 28, further comprising water, salt water, or a water-isopropanol solution.

33. A computer, comprising:

a base portion;

a cover pivotally mounted to said base portion, wherein at least one of said base portion and said cover includes at least one component that generates heat; and at least one heat cell configured to receive liquid, said at least one heat cell being transparent so that the liquid is apparent to a user of the computer during operation of the computer, wherein said at least one cell is in thermal communication with said at least one component, such that when said at least one cell contains liquid, heat is transferred from said at least one component, to the liquid, and away from said computer, thereby maintaining the temperature of said computer within a working range.

34. The computer of claim 33, wherein:

said at least one component includes a central processing unit (CPU);

said base portion includes an input/output device; and said cover includes a display.

35. The computer of claim 34, further including a disk drive.

36. The computer of claim 35, wherein said at least one cell is attached to said cover.

37. The computer of claim 36, said at least one cell comprising a bubble lamp.

38. The computer of claim 36, said at least one cell comprising a glitter lamp.

39. The computer of claim 36, said at least one cell comprising a convective fluid lamp displaying continually changing fluid patterns.

40. The computer of claim 36, wherein said at least one cell has a cross section that is rectangular, triangular, semicircular, or semielliptical.

41. A computer, comprising:

a base portion;

a cover pivotally mounted to said base portion, wherein at least one of said base portion and said cover includes at least one component that generates heat; and at least one liquid-containing cell that is transparent so that the liquid therein is clearly visible, wherein said liquid is in thermal communication with said at least one component, such that heat is transferred from said at least one component to said liquid and then from said liquid to away from said computer, thereby maintaining the temperature of said computer within a working range.

42. The computer of claim 41, wherein:

said at least one component includes a central processing unit (CPU);

said base portion includes an input/output device; and said cover includes a display.

43. The computer of claim 42, further including a disk drive.

44. The computer of claim 43, wherein said at least one cell is attached to said cover.

45. The computer of claim 44, wherein said at least one cell includes fasteners that mate with said cover.

46. The computer of claim 44, wherein at least one cell is disposed on each of two sides of said display.

47. The computer of claim 44, comprising a display on a front side of said cover, wherein said at least one cell is disposed on a back side of said cover.

48. The computer of claim 44, said at least one cell comprising a bubble lamp.

49. The computer of claim 44, said at least one cell comprising a glitter lamp.

50. The computer of claim 44, said at least one cell comprising a convective fluid lamp displaying continually changing fluid patterns.

51. The computer of claim 44, wherein said liquid includes a liquid selected from the group consisting of benzyl alcohol, cinnamyl alcohol, diethyl phthalate, and ethyl salicylate.

52. The computer of claim 44, wherein said liquid includes a colored compound.

53. The computer of claim 44, wherein the Rayleigh number of said at least one cell is greater than about 1700.

54. The computer of claim 44, wherein light from said display is directed into said at least one cell to produce a visual effect.

55. The computer of claim 44, wherein audio output is coupled into said at least one cell to produce a visual effect.

56. The computer of claim 44, comprising a preservative to prevent the growth of algae.

57. The computer of claim 44, wherein said at least one cell has a cross section that is rectangular, triangular, semicircular, or semielliptical.

58. The computer of claim 51, further comprising water, salt water, or a water-isopropanol solution.

59. A computer, comprising:

at least one component that generates heat; and a heat exchange material in thermal communication with said at least one component, the heat exchange material having an appearance that changes noticeably upon heating during operation of the computer, wherein heat is transferred from said at least one component to said heat exchange material and then from said material to away from said computer to maintain the temperature of said computer within a working range.

60. The computer of claim 59, comprising:

an input/output device; and a display, wherein said at least one component includes a central processing unit (CPU).

61. The computer of claim 59, wherein said heat exchange material includes metal having a liquid crystal material thereon.

62. The computer of claim 59, comprising at least one liquid-containing heat sink cell in thermal communication with said component, such that heat is transferred from said component to said liquid and then from said liquid to away from said computer.

63. A computer, comprising:

a base portion that includes an input/output device;

a cover pivotally mounted to said base portion, wherein at least one of said base portion and said cover includes at least one component that generates heat, said at least one component including a central processing unit (CPU), said cover including a front side that comprises a display; and at least one liquid-containing cell, wherein said liquid is in thermal communication with said at least one component, such that heat is transferred from said at least one component to said liquid and then from said liquid to away from said computer, thereby maintaining the temperature of said computer within a working range, wherein said at least one cell is attached to said cover, said at least one cell being disposed on a back side of said cover.

* * * * *